United States Patent
Inagaki et al.

(10) Patent No.: US 8,211,566 B2
(45) Date of Patent: Jul. 3, 2012

(54) NEGATIVE ELECTRODE ACTIVE MATERIAL FOR BATTERIES, NON-AQUEOUS ELECTROLYTE BATTERY AND BATTERY PACK

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/185,541

(22) Filed: Jul. 19, 2011

(65) Prior Publication Data
US 2011/0274962 A1     Nov. 10, 2011

Related U.S. Application Data

(63) Continuation of application No. PCT/JP2009/068724, filed on Oct. 30, 2009.

(30) Foreign Application Priority Data

Jan. 21, 2009     (JP) .................................. 2009-011186

(51) Int. Cl.
*H01M 6/42* (2006.01)
*H01M 2/00* (2006.01)
*H01M 4/02* (2006.01)
*H01M 4/13* (2010.01)
*H01M 4/58* (2010.01)

(52) U.S. Cl. ..... 429/163; 429/149; 429/209; 429/218.1; 429/231.9

(58) Field of Classification Search .................. 429/149, 429/163, 209, 218.1, 239.1, 141, 231.9
See application file for complete search history.

(56) References Cited

U.S. PATENT DOCUMENTS

| | | | |
|---|---|---|---|
| 2005/0058907 A1* | 3/2005 | Kurihara et al. | .............. 429/232 |
| 2005/0064096 A1* | 3/2005 | Kurihara et al. | .............. 427/215 |
| 2007/0281214 A1 | 12/2007 | Saruwatari et al. | |
| 2008/0113264 A1 | 5/2008 | Inagaki et al. | |
| 2010/0092846 A1 | 4/2010 | Takami et al. | |

FOREIGN PATENT DOCUMENTS

| | | | |
|---|---|---|---|
| EP | 0617474 | * | 3/1994 |
| EP | 1057783 | * | 12/2000 |
| JP | 2001-243950 A | | 9/2001 |
| JP | 2004-235144 A | | 8/2004 |
| JP | 2005-183179 A | | 7/2005 |
| JP | 2008-10394 A | | 1/2008 |

(Continued)

OTHER PUBLICATIONS

Kersit et al. Journal of Physical Chemistry 2010 vol. 114 pp. 19096-19107.*

(Continued)

*Primary Examiner* — Patrick Ryan
*Assistant Examiner* — Aaron Greso
(74) *Attorney, Agent, or Firm* — Oblon, Spivak, McClelland, Maier & Neustadt, L.L.P.

(57) ABSTRACT

According to one embodiment, a non-aqueous electrolyte battery includes an outer container, a positive electrode housed in the outer container, a negative electrode housed in the outer container such as to spatially apart from the positive electrode and includes a particulate active material, and a non-aqueous electrolyte filled in the outer container, wherein the particulate active material includes a particle containing a substance having a lithium absorption and desorption potential of from 1 V vs. Li/Li$^+$ to 3 V vs. Li/Li$^+$, and a coating layer made of a spinel-type lithium-titanium composite oxide formed on the surface of the particle.

12 Claims, 3 Drawing Sheets

FOREIGN PATENT DOCUMENTS

| | | | |
|---|---|---|---|
| JP | 2008-123787 A | 5/2008 | |
| JP | 2009-252421 A | 10/2009 | |

OTHER PUBLICATIONS

Nakazawa et al. Nuclear Instruments and Methods in Physics Research B vol. 206 2003 pp. 166-1700.*

U.S. Appl. No. 12/428,131, filed Apr. 22, 2009, Takami et al.
International Search Report issed Jan. 1, 2010, in PCT/JP2009/068724, filed Oct. 30, 2009.
International Written Opinion issed Jan. 1, 2010, in PCT/JP2009/068724, filed Oct. 30, 2009.

* cited by examiner

NEGATIVE ELECTRODE ACTIVE MATERIAL FOR BATTERIES, NON-AQUEOUS ELECTROLYTE BATTERY AND BATTERY PACK

CROSS-REFERENCE TO RELATED APPLICATIONS

This application is a Continuation Application of PCT Application No. PCT/JP2009/068724), filed Oct. 30, 2009 and based upon and claiming the benefit of priority from prior Japanese Patent Application No. 2009-011186, filed Jan. 21, 2009, the entire contents of all of which are incorporated herein by reference.

FIELD

Embodiments described herein relate generally to a negative electrode active material for batteries, a non-aqueous electrolyte battery and a battery pack.

BACKGROUND

Research and development of non-aqueous electrolyte batteries in which charging and discharging are performed by transfer of lithium ion between a negative electrode and a positive electrode have been advanced actively as high-energy density batteries.

Various properties are desired for a non-aqueous electrolyte battery depending on the application thereof. For example, use at a discharge of about 3 C is estimated for use in power sources of digital cameras, and use at a discharge of about 10 C or more is estimated for use in hybrid battery automobiles and the like. Therefore, high current property is specifically desired for non-aqueous electrolyte batteries for use in these applications.

Currently, non-aqueous electrolyte batteries using a lithium-transition metal composite oxide as a positive electrode active material and a carbonaceous matter as a negative electrode active material are commercialized. As a transition metal for a lithium-transition metal composite oxide, Co, Mn and Ni are generally used.

In recent years, there is a fear that the safety of non-aqueous electrolyte batteries is decreased by the progress in increasing of an output, increasing of an energy density and increasing of a capacity.

For safety of a non-aqueous electrolyte, over-charge/over-discharge can be prevented by an outer circuit (protection circuit). On the other hand, an internal short circuit that is caused by, for example, incorporation of a conductive foreign substance in production steps cannot be prevented by an outer circuit (protection circuit). Therefore, it is necessary to address internal short circuiting by a battery itself.

DETAILED DESCRIPTION

Hereinafter, the negative electrode active material for batteries, non-aqueous electrolyte battery and battery pack according to the embodiments are explained in detail.

In general, according to one embodiment, a particulate negative electrode active material for batteries comprises a particle containing a substance having a lithium absorption and desorption potential of from 1 V vs. Li/Li$^+$ to 3 V vs. Li/Li$^+$; and a coating layer made of a spinel-type lithium-titanium composite oxide formed on the surface of the particle.

Figure 5:
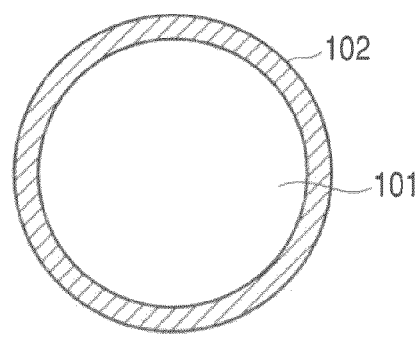
FIG. 5 is a cross-sectional view of a negative electrode active material for batteries according to the embodiment.

Typically, as shown in FIG. 5, the particulate negative electrode active material comprises a particle 101 containing a substance having a lithium absorption and desorption potential of from 1 V vs. Li/Li$^+$ to 3 V vs. Li/Li$^+$, and a coating layer 102 made of a spinel-type lithium-titanium composite oxide formed on the surface of the particle 101.

In the negative electrode active material having such structure, when an internal short circuit is occurred at an area on which the positive electrode and negative electrode are opposed, a coating layer made of the spinel-type lithium-titanium composite oxide is formed on the surface of the active material that becomes a short-circuit portion, and the coating layer shows insulating properties. Therefore, a high current is difficult to be passed between the particulate negative electrode active materials. As a result, a battery having a negative electrode comprising the above-mentioned particulate negative electrode active material can suppress heat generation and improve safety.

Namely, the spinel-type lithium-titanium composite oxide (for example, Li$_4$Ti$_5$O$_{12}$) has a lithium absorption and desorption potential of approximately 1.55 V vs. Li/Li$^+$, and lithium is absorbed and desorbed as shown in the following formula (1) in accordance with the charging and discharging of the battery.

$$Li_4Ti_5O_{12}+3Li^++3e^- \Leftrightarrow Li_7Ti_5O_{12} \qquad (1)$$

In the formula (1), the rightward arrow represents charging, and the leftward arrow represents discharging.

Li$_4$Ti$_5$O$_{12}$ in a state that lithium is not absorbed as in the above-mentioned formula (1) substantially shows insulating properties. On the other hand, a lithium-titanium composite oxide (Li$_7$Ti$_5$O$_{12}$) on which lithium is absorbed shows conductivity.

In a particulate negative electrode active material having a surface on which a coating layer made of lithium-titanium composite oxide is formed, when the foreign substance, for example, is present on an area at which a positive electrode and a negative electrode are opposed, an internal short circuit is occurred between the positive electrode and the negative electrode. At this time, since the foreign substance contacts the coating layer formed on the surface of the negative electrode active material, rapid discharging is produced at the contacting portion between the spinel-type lithium-titanium composite oxide that is a coating layer material and the foreign substance, and lithium is not absorbed in such state. Namely, the coating layer portion (short-circuit portion) of the lithium-titanium composite oxide contacting the foreign substance substantially shows insulating properties according to the above-mentioned formula (1). As a result, the flow of a current between the positive electrode and negative electrode through the foreign substance is limited by the coating layer of the above-mentioned lithium-titanium composite oxide showing insulating properties, and thus a high current becomes difficult to be passed. Therefore, the battery is restored to its normal state within a very short period after internal short circuiting, and thus heat generation can be suppressed and safety can be improved.

Furthermore, general charging and discharging by absorption and desorption of lithium are performed on the coating layer made of the spinel-type lithium-titanium composite oxide after internal short circuiting due to, for example, contact with a foreign substance, except for the time at which the portion contacting the foreign substance is substantially in the state of showing insulating properties and lithium is not absorbed. Namely, the coating layer of the negative electrode active material absorbs lithium in a general charging and discharging state, whereby shows relatively fine conductivity as compared to that in the state in which lithium is not absorbed. As a result, the coating layer of the above-mentioned negative electrode active material does not act as a resistance component against the negative electrode in a general charging and discharging state as an inorganic insulating layer (for example, an alumina layer) formed on the surface of a conventional negative electrode does, and thus high current performance can be maintained.

Furthermore, since the particle and coating layer are both oxides in the embodiment wherein the coating layer made of the spinel-type lithium-titanium composite oxide is formed on the surface of the particle containing the substance (for example, an oxide) having a lithium absorption and desorption potential of from 1 V vs. Li/Li$^+$ to 3 V vs. Li/Li$^+$, oxidation of the particle is not produced during the formation of the coating layer. As a result, production of a gap (high-resistance layer) at the boundary of the carbon and coating layer, which occurs when a coating layer made of a lithium-titanium composite oxide is formed on a conventional carbon, can be avoided, whereby tight adhesion between the particle and the coating layer can be improved. Therefore, the non-aqueous electrolyte battery comprising the negative electrode comprising the negative electrode active material according to the embodiment can express fine high current performance.

The spinel-type lithium-titanium composite oxide is preferably $Li_{4+x}Ti_5O_{12}$ ($-1 \leq x \leq 3$) in view of reversibility of charging and discharging (charge-discharge cycle performance). In addition, although the molar ratio of the oxygen in the lithium-titanium composite oxide is formally represented to be 12 for the spinel-type $Li_{4+x}Ti_5O_{12}$ ($-1 \leq x \leq 3$), the value can vary according to the influence of oxygen non-stoichiometry and the like. Furthermore, the effect of the embodiment is not lost even when unintended impurities and the like are included.

The thickness of the coating layer is preferably 5 nm or more. When the thickness of the coating layer is lower than 5 nm, fine current blocking effect may not be obtained during internal short circuiting. A more preferable thickness of the coating layer is 30 nm or more. Considering the above-mentioned effect, the upper limit of the thickness of the coating layer is not limited. However, since the theoretical capacity of the spinel-type lithium-titanium composite oxide is 175 mAh/g, in the case when the capacity of the substance that constitutes the particle is higher than that of the spinel-type lithium-titanium composite oxide, it is preferable that the thickness of the coating layer is decreased in view of improvement of the capacity of the battery (active material).

The above-mentioned effect can be obtained by forming the coating layer made of the spinel-type lithium-titanium composite oxide on a part of the surface of the particle. Preferably, the coating layer is formed by a surface area of 30% or more, more preferably 50% or more, and the most preferably 100% (whole surface) with respect to the surface of the particle.

The substance that constitutes the particle (core) of the negative electrode active material preferably has a lithium absorption and desorption potential of from 1 to 3 V vs. Li/Li$^+$ and is an oxide as mentioned above.

The coating layer preferably has fine reversibility during charging and discharging. This can be achieved by decreasing the difference in lithium absorption and desorption potential between the substance included in the particle and the coating layer made of the spinel-type lithium-titanium composite oxide. The spinel-type lithium-titanium composite oxide has a lithium absorption and desorption potential of 1.55 V vs. Li/Li$^+$. Therefore, the substance that constitutes the particle is preferably a substance having lithium absorption and desorption potential that relatively approximates 1.55 V vs. Li/Li$^+$, for example, at least one selected from a lithium-titanium composite oxide other than a spinel-type structure, a lithium-molybdenum composite oxide and a lithium-niobium composite oxide.

The substance that constitutes the particle is preferably at least one selected from ramsdellite-type, anatase-type, rutile-type, brookite-type or bronze-type lithium-titanium composite oxides in view of reversibility of charging and discharging (charge-discharge cycle property).

Examples of the lithium-titanium composite oxide may include anatase-type, rutile-type, brookite-type or bronze-type titanium-based oxides such as $TiO_2$, titanium-based oxides having a ramsdellite structure and the like such as $Li_{2+y}Ti_3O_7$ ($0 \leq y \leq 3$), or titanium-based oxides obtained by replacing a part of these constitutional elements with a heterogeneous element, and the like. As the titanium-based oxide, besides $TiO_2$, titanium-containing metal composite oxides comprising Ti and at least one element selected from the group consisting of P, V, Sn, Cu, Ni, Fe and Co {for example, $TiO_2$—$P_2O_5$, $TiO_2$—$V_2O_5$, $TiO_2$—$P_2O_5$—$SnO_2$, $TiO_2$—$P_2O_5$—MeO (Me is at least one element selected from the group consisting of Cu, Ni, Fe and Co) and the like} can be used. All of these titanium-based oxides have a lithium absorption and desorption potential of from 1 to 2 V vs. Li/Li$^+$. It is preferable that such titanium-containing metal composite oxides have a microstructure in which a crystal phase and an amorphous phase are present together or only an amorphous phase is present. A titanium-containing metal composite oxide having a microstructure can take a substantially high capacity even in high-efficiency charging and discharging, and can significantly improve cycle performance.

As the molybdenum-based oxide, for example, $Li_xMoO_2$ (lithium absorption and desorption potential: from 1 to 2 V vs. Li/Li$^+$) and $Li_xMoO_3$ (lithium absorption and desorption potential: from 1 to 3 V vs. Li/Li$^+$) can be used. As the niobium-based oxide, for example, $Li_xNb_2O_5$ (lithium absorption and desorption potential: from 1 to 3 V vs. Li/Li$^+$) can be used.

Among such substances having a lithium absorption and desorption potential of from 1 to 3 V vs. Li/Li$^+$, a ramsdellite-type or bronze-type titanium-based oxide is preferable since it has excellent reversibility of charging and discharging (charge-discharge cycle property). Furthermore, a bronze-type titanium-based oxide is the most preferable since it has a large electrical capacitance.

Next, a method for forming a coating layer made of a spinel-type lithium-titanium composite oxide on the surface of a particle containing the substance having a lithium absorption and desorption potential of from 1 to 3 V vs. Li/Li$^+$ is explained.

The method for forming the coating layer can be realized, for example, by combining a dry coating treatment method such as a CVD process and a sputtering process, a wet coating treatment method such as a sol-gel process, with a suitable heat treatment.

For forming a uniform coating layer on the surface of a particle, it is preferable to adopt, for example, a tumbling-fluidizing coating process. The tumbling-fluidizing coating process is a method in which a solution of a coating layer material is sprayed on fluidizing particle. By repeating application of the solution to the surface of the particle and drying, a homogeneous coating layer having a uniform thickness can be formed on the surface of the particle.

As an apparatus for tumbling-fluidizing coating, for example, MP-01 manufactured by Powrex Corporation can be used. By putting the particle into a tumble-fluidizing bath of the apparatus, spraying a solution in which alkoxides of lithium and titanium are dissolved in ethanol while performing tumble-fluidization, and adding a heat treatment, the negative electrode active material in which the coating layer made of the spinel lithium-titanium composite oxide is formed on the surface of the particle can be obtained.

Specifically, a titanium alkoxide (for example, titanium isopropoxide) is prepared as a titanium source, and a water-soluble salt of lithium (for example, lithium nitrate or the like) is prepared as a lithium source. The titanium alkoxide is dissolved in ethanol, and an aqueous solution of the water-soluble salt of lithium was added to the ethanol solution of the titanium alkoxide under stirring by an amount that gives a predetermined composition to give a solution. The solution is sprayed on the particles comprising a substance having a lithium absorption and desorption potential of from 1 to 3 V vs. $Li/Li^+$, and the coated particle is calcined at from 200 to 900° C. to prepare a particulate negative electrode active material. At this time, when the temperature is lower than 200° C., the reactivity becomes poor, and the organic components included in the raw materials remain in the structure without being decomposed. On the other hand, when the temperature exceeds 900° C., it is highly possible that a part of the components evaporates or reacts with the particles, whereby formation of the coating layer made of the spinel-type lithium-titanium composite oxide having an objective composition becomes difficult.

According to such method, an approximately uniform coating layer can be formed on the surface of a particle whatever the form of the particle is. Furthermore, since the tight adhesion between the coating layer and particle is improved, a stable and high effect can be obtained even charging and discharging are repeated for a long time period.

The particulate negative electrode active material has an average particle size of 3 μm or less, preferably from 0.1 to 3 μm, the most preferably from 0.1 to 1 μm. The particulate negative electrode active material preferably has a specific surface area by a BET method by $N_2$ absorption of from 5 to 50 $m^2/g$. The particulate negative electrode active material having such average particle size and specific surface area can improve their availability and can take substantially a high capacity even during high-efficiency charging and discharging. The BET specific surface area by gaseous $N_2$ absorption can be measured, for example, by using Micromeritics ASAP-2010 by Shimadzu Corporation using $N_2$ as an absorption gas. In general, as the average particle size of the active material is decreased and as the specific surface area is increased, the high current performance (output performance) is more improved. On the other hand, a current that is passed during internal short circuiting is increased, and thus the safety of the battery is significantly decreased. Such problem is eliminated by using the particulate negative electrode active material of the embodiment, whereby high current performance (output performance) and high safety can be achieved at the same time.

Next, a non-aqueous electrolyte battery according to the embodiment is explained in detail.

In general, according to one embodiment, a non-aqueous electrolyte battery comprises an outer container, a positive electrode housed in the outer container, a negative electrode housed in the outer container such as to spatially apart from the positive electrode, for example, through a separator and comprising a particulate active material, and a non-aqueous electrolyte filled in the outer container, wherein the particulate active material comprises a particle containing a substance having a lithium absorption and desorption potential of from 1 V vs. $Li/Li^+$ to 3 V vs. $Li/Li^+$, and a coating layer made of a spinel-type lithium-titanium composite oxide formed on the surface of the particle.

Hereinafter the outer container, negative electrode, non-aqueous electrolyte, positive electrode and separator are explained in detail.

1) Outer Container

The outer container, which is made of a laminate film having a thickness of 0.5 mm or less or a metal foil having a thickness of 1.0 mm or less, is used. The metal outer container preferably has a thickness of 0.5 mm or less.

Examples of the form of the outer container may include a flat type (thin type), a square type, a cylindrical type, a coin type, a button type and the like. Examples of the outer container may include outer containers for small batteries that are loaded on portable electronic devices and the like, outer containers for large batteries that are loaded on two to four-wheeled automobiles and the like.

As the laminate film, a multilayer film, which comprises resin layers and a metal layer interposed the resin layers, is used. The metal layer is preferably an aluminum foil or aluminum alloy foil for weight saving. For the resin layer, for example, polymer materials such as polypropylene (PP), polyethylene (PE), nylon or polyethylene telephthalate (PET) can be used. The laminate film can be formed into the shape of the outer container by sealing by thermal fusion bonding.

The metal can is made of, for example, aluminum, an aluminum alloy or the like. As the aluminum alloy, alloys comprising elements such as magnesium, zinc and silicon are preferable. When the alloy comprises a transition metal such as iron, copper, nickel and chromium, the amount thereof is preferably 100 weight ppm or less.

2) Negative Electrode

The negative electrode comprises a current collector, and a negative electrode layer formed on at least one surface of the current collector and comprising an active material, a conductive agent and a binder.

The active material is the above-mentioned particulate negative electrode active material that comprises particle containing a substance having a lithium absorption and desorption potential of from 1 to 3 V vs. $Li/Li^+$, and a coating layer made of a spinel-type lithium-titanium composite oxide formed on the surface of the particle.

As the substance included in the particle and the spinel-type lithium-titanium composite oxide, those as explained for the above-mentioned negative electrode active material for batteries can be used.

As the conductive agent, for example, a carbon material can be used. Examples of the carbon material include acetylene black, carbon black, coke, carbon fibers and graphite. Examples of other conductive agent include metal powders such as an aluminum powder, and conductive ceramics such as TiO. Of these, coke and graphite having an average particle size of 10 μm or less, which are heat-treated at from 800 to 2,000° C., and carbon fibers having an average particle size of 1 μm or less are preferable. The BET specific surface area of the carbon material by $N_2$ absorption is preferably 10 $m^2/g$ or more.

Examples of the binder include polytetrafluoroethylene (PTFE), polyvinylidene fluoride (PVdF), fluorine-based rubbers, styrene-butadiene rubbers and core-shell binders.

The incorporation ratio of the active material, conductive agent and binder is preferably adjusted to from 70% by weight to 96% by weight of the active material, from 2% by weight to 10% by weight of the conductive agent, and from 2% by weight to 28% by weight of the binder. When the amount of the conductive agent is lower than 2% by weight, the current collecting performance of the negative electrode layer is decreased, whereby the high current property of the non-aqueous electrolyte battery may be decreased. Furthermore, when the amount of the binder is lower than 2% by weight, the binding property between the negative electrode layer and current collector is decreased, whereby cycle property may be decreased. Meanwhile, in view of improvement of capacity, the conductive agent and binder are preferably adjusted to 10% by weight or less, and to 28% by weight or less, respectively.

The negative electrode layer preferably has porosity in the range of from 20 to 50%. The negative electrode comprising the negative electrode layer having such porosity has an increased density and shows excellent affinity to the non-aqueous electrolyte. A more preferable range of the porosity is from 25 to 40%.

As the current collector, a copper foil, nickel foil, stainless steel foil, aluminum foil or aluminum alloy foil can be used. When the lithium of the negative electrode active material (interior particle) included in the negative electrode layer has an absorption and desorption potential of 1 V vs. $Li/Li^+$, it is preferable to use an aluminum foil or aluminum alloy foil in view of weight saving and the over-discharge resistance of the battery.

Hereinafter, the form of a preferable aluminum foil or aluminum alloy foil is explained.

The negative electrode current collector preferably has an average crystal grain size of 50 μm or less. Accordingly, the strength of the current collector can be increased dramatically, whereby the density of the negative electrode can be increased under a high press pressure and the battery capacity can be increased. Furthermore, dissolution and deterioration by corrosion of the current collector of the negative electrode during over-discharge cycles under a high temperature environment (40° C. or more) can also be prevented. Therefore, increase in the impedance of the negative electrode can be suppressed. In addition, the output property, rapid charging, and charge-discharge cycle property can also be improved. The average crystal grain size is 30 μm or less, more preferably 5 μm or less.

The average crystal grain size is obtained as follows. The tissue on the surface of the current collector is tissue-observed by an optical microscope, and the number n of the crystal grains that are present within 1 mm×1 mm is obtained. Using this n, an average crystal grain size surface area S is obtained from $S=1\times10^6/n$ (μm$^2$). An average crystal grain size d (μm) is calculated from the value of the obtained S according to the following formula (1).

$$d=2(S/n)^{1/2} \tag{1}$$

An aluminum foil or aluminum alloy foil having the above-mentioned average crystal grain size in the range of 50 μm or less is intricately affected by a plurality of factors such as a material tissue, impurities, a processing condition, a heat treatment history and an annealing condition, and the above-mentioned crystal grain size is adjusted by combining the above-mentioned factors in the production steps.

The aluminum foil and aluminum alloy foil each has a thickness of 20 μm or less, more preferably 15 μm or less. The aluminum foil preferably has a purity of 99% by weight or more. As the aluminum alloy, an alloy comprising an element such as magnesium, zinc and silicon is preferable. On the other hand, a transition metal such as iron, copper, nickel and chromium is preferably 1% by weight or less.

The negative electrode is prepared, for example, by suspending a negative electrode active material, a conductive agent and a binder in a general solvent to prepare a slurry, applying the slurry to a negative electrode current collector and drying to form a negative electrode layer, and subjecting the negative electrode layer to pressing. Alternatively, the negative electrode active material, conductive agent and binder may be formed into pellets and used as the negative electrode layer.

Such negative electrode may have a structure in which plurality of negative electrode layers are laminated. Namely, the negative electrode layer may have a multilayer structure comprising a current collector, at least one primary negative electrode layer formed on the surface of the current collector and comprising an active material that is different from the above-mentioned particulate negative electrode active material, and a surface layer formed on the surface of the primary negative electrode layer and comprising the above-mentioned particulate negative electrode active material. The different active material is not specifically limited as long as it is a substance that acts as a negative electrode active material. This is because, when short circuit occurs by interposition of a conductive foreign substance between the positive electrode and negative electrode, if the above-mentioned negative electrode active material having the coating layer is disposed on only the surface layer of the negative electrode, the effect of the embodiment can be obtained. The different active material preferably has a higher capacity than that of the above-mentioned negative electrode active material having the coating layer in view of energy density. Specific examples of the different active material may include carbon materials such as graphite, lithium alloys such as Li—Si or Li—Sn, or oxides of such as Si or Sn.

Examples of the surface layer in the negative electrode layer may include 1) a layer comprising the above-mentioned particulate negative electrode active material alone, 2) a layer in which the binder is mixed with the particulate negative electrode active material, and 3) a layer in which the particulate negative electrode active material is mixed with the conductive agent and binder.

The surface layer made of the particulate negative electrode active material alone of the above-mentioned 1) may also be formed by, for example, a dry coating treatment method such as a CVD process and a sputtering process. The surface layer comprising the particulate negative electrode active material in the above-mentioned 2) and 3) can be formed, for example, by dispersing the particulate negative electrode active material together with the binder, or with the binder and conductive agent in a solvent such as N-methylpyrrolidone (NMP) to prepare a slurry, and applying and drying the slurry. This application method may form a thick film within a short time period in industries.

The primary negative electrode layer in the negative electrode layer has a structure of one layer or two or more layers comprising an active material that is different from the above-mentioned particulate negative electrode active material in the surface layer.

The active material included in the primary negative electrode layer preferably has a lithium absorption and desorption potential of from 1 to 3 V vs. Li/Li$^+$. When the lithium absorption and desorption potential exceeds 3 V vs. Li/Li$^+$, the voltage of the battery may decrease, and thus the energy density of the battery may decrease. It is preferable that the active material included in such primary negative electrode layer is selected from lithium-titanium composite oxides (except for a spinel-type structure), lithium-molybdenum composite oxides and lithium-niobium composite oxides, which are similar to those for the above-mentioned particle substance in the negative electrode active material.

It is preferable that the active material included in the primary negative electrode layer is selected from ramsdellite-type, anatase-type, rutile-type, brookite-type or bronze-type lithium-titanium composite oxides in view of reversibility of charging and discharging (charge-discharge cycle property).

3) Non-Aqueous Electrolyte

Examples of the non-aqueous electrolyte may include liquid non-aqueous electrolytes that are prepared by dissolving an electrolyte in an organic solvent, gel-like non-aqueous electrolytes obtained by compounding a liquid electrolyte and a polymer material, and the like.

The liquid non-aqueous electrolyte is prepared by dissolving an electrolyte in an organic solvent at a concentration of from 0.5 mol/L to 2.5 mol/L.

Examples of the electrolyte may include lithium salts such as lithium perchlorate ($LiClO_4$), lithium phosphate hexafluoride ($LiPF_6$), lithium borate tetrafluoride ($LiBF_4$), lithium arsenic hexafluoride ($LiAsF_6$), lithium trifluoromethanesulfonate ($LiCF_3SO_3$) and lithium bistrifluoromethanelsulfonylimide [$LiN(CF_3SO_2)_2$], or mixtures thereof. Those being hardly oxidized even at a high potential are preferable, and $LiPF_6$ is the most preferable.

Examples of the organic solvent may include cyclic carbonates such as propylene carbonate (PC), ethylene carbonate (EC) and vinylene carbonate; chain carbonates such as diethyl carbonate (DEC), dimethyl carbonate (DMC) and methyl ethyl carbonate (MEC); cyclic ethers such as tetrahydrofuran (THF), 2-methyltetrahydrofuran (2-MeTHF) and dioxolane (DOX); chain ethers such as dimethoxyethane (DME) and diethoethane (DEE); γ-butyrolactone (GBL), acetonitrile (AN) and sulfolane (SL). These organic solvents may be used solely or as a mixture.

Examples of the polymer material include polyvinylidene fluoride (PVdF), polyacrylonitrile (PAN) and polyethylene oxide (PEO).

Preferable organic solvents are mixed solvents that are obtained by mixing two or more selected from the group consisting of propylene carbonate (PC), ethylene carbonate (EC) and γ-butyrolactone (GBL). A further preferable organic solvent is γ-butyrolactone (GBL). The reason is as follows.

A lithium-titanium composite oxide phase that is a primary material of a negative electrode active material absorbs and desorbs lithium ion at a potential area of approximately from 1 to 2V vs. Li/Li$^+$. However, reduction decomposition of a non-aqueous electrolyte is difficult to occur in this potential area, and thus a coating that is a reduction product of the non-aqueous electrolyte is hard to be formed on the surface of the lithium-titanium composite oxide. Therefore, when stored in a lithium-absorption state, i.e., a charging state, the lithium ion absorbed on the lithium-titanium composite oxide may gradually diffuse in the electrolyte and self-discharging may occur. Self-discharging appears significantly when the temperature of the storage environment of a battery rises.

Among organic solvents, γ-butyrolactone is reduced more easily than chain carbonates or cyclic carbonates. Specifically, reduction occurs more easily in order of γ-butyrolactone>>>ethylene carbonate>propylene carbonate>>dimethyl carbonate>methyl ethyl carbonate>diethyl carbonate. Therefore, by incorporating γ-butyrolactone into the electrolyte, a fine coating can be formed on the surface of the lithium-titanium composite oxide even at the working potential area of the lithium-titanium composite oxide. As a result, self-discharging can be suppressed, and the high-temperature storage property of the non-aqueous electrolyte battery can be improved.

Also for the above-mentioned mixed solvents that are obtained by mixing two or more selected from the group consisting of propylene carbonate (PC), ethylene carbonate (EC) and γ-butyrolactone (GBL), specifically for the mixed solvents comprising γ-butyrolactone, self-discharging can be suppressed and the high-temperature storage property of the non-aqueous electrolyte battery can be improved similarly.

γ-butyrolactone is preferable since a fine protective coating can be formed by incorporating it in an organic solvent by an amount of from 40% by volume to 95% by volume.

4) Positive Electrode

The positive electrode comprises a current collector, and a positive electrode layer formed on at least one surface of the current collector and comprising an active material, a conductive agent and a binder.

Preferable examples of the current collector are an aluminum foil, or aluminum alloy foils comprising elements such as Mg, Ti, Zn, Mn, Fe, Cu and Si.

As the active material, for example, an oxide, a polymer and the like can be used.

Examples of the oxide include manganese dioxide ($MnO_2$), iron oxide, copper oxide and nickel oxide that have absorbed lithium, and lithium-manganese composite oxides (for example, $Li_xMn_2O_4$ or $Li_xMnO_2$), lithium-nickel composite oxides (for example, $Li_xNiO_2$), lithium-cobalt composite oxides ($Li_xCoO_2$), lithium-nickel-cobalt composite oxides (for example, $LiNi_{1-y}Co_yO_2$), lithium-manganese-cobalt composite oxides (for example, $Li_xMn_yCo_{1-y}O_2$), spinel-type lithium-manganese nickel composite oxides ($Li_xMn_{2-y}Ni_yO_4$), olivine-type lithium phosphorous oxides (for example, $Li_xFePO_4$, $Li_xFe_{1-y}Mn_yPO_4$, $Li_xCoPO_4$), iron sulfate ($Fe_2(SO_4)_3$) and vanadium oxide (for example, $V_2O_5$). It is preferable that x and y are such that $0<x≦1$ and $0<y≦1$, respectively.

Examples of the polymer include conductive polymer materials such as polyaniline and polypyrrole, and disulfide-based polymer materials. As other polymers, sulfur, carbon fluoride and the like can also be used.

Preferable positive electrode active materials may include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}Co_yO_2$), spinel-type lithium-manganese-nickel composite oxides ($Li_xMn_{2-y}Ni_yO_4$), lithium-manganese-cobalt composite oxides ($Li_xMn_yCo_{1-y}O_2$), lithium phosphate iron ($Li_xFePO_4$) and the like, which have a high positive electrode voltage. It is preferable that x and y are such that $0<x≦1$ and $0<y≦1$, respectively.

Further preferable active materials are lithium-cobalt composite oxides or lithium-manganese-composite oxides. Since they have high ion conductivity, diffusion of the lithium ion in the positive electrode active material is hard to be a rate-controlling step when combined with the negative electrode active material of the embodiment. Therefore, they are excellent in compatibility with the lithium-titanium composite oxide in the negative electrode active material of the embodiment.

The primary particle size of the active material is preferably from 100 nm to 1 μm since handling in industrial production becomes easy. Furthermore, diffusion of lithium ion in a solid can proceed smoothly.

The specific surface area of the active material is preferably from 0.1 to 10 m²/g since sufficient sites for absorption and desorption of lithium ion can be ensured and handling in industrial production becomes easy. Furthermore, fine charge-discharge cycle performance can be ensured.

Examples of the conductive agent include carbonaceous materials such as acetylene black, carbon black and graphite.

Examples of the binder include polytetrafluoroethylene (PTFE), polyvinylidene fluoride (PVdF) and fluorine-based rubbers.

The incorporation ratio of the active material, conductive agent and binder is preferably adjusted to from 80% by weight to 95% by weight of the active material, from 3% by weight to 18% by weight of the conductive agent, and from 2% by weight to 17% by weight of the binder. The above-mentioned effects can be exerted by incorporating 3% by weight or more of the conductive agent, and decomposition of the non-aqueous electrolyte on the surface of the conductive agent under storage at a high temperature can be decreased by incorporating 10% by weight or less. Sufficient electrode strength can be obtained by incorporating 2% by weight or more of the binder, and the incorporation amount of an insulator for the electrode can be decreased and thus an internal resistance can be decreased by incorporating 10% by weight or less.

The positive electrode is prepared by, for example, suspending the active material, conductive agent and binder in a suitable solvent to prepare a slurry, applying the slurry to the positive electrode current collector and drying to prepare a positive electrode layer, and subjecting the positive electrode layer to pressing. Alternatively, the active material, conductive agent and binder may be formed into pellets and used as the positive electrode layer.

5) Separator

Examples of the separator may include porous films comprising polyethylene, polypropylene, cellulose or polyvinylidene fluoride (PVdF), nonwoven fabrics made of synthetic resins, and the like. Among these, porous films composed of polyethylene or polypropylene can be molten at a certain temperature to block a current, and thus are preferable in view of improvement of safety.

Figure 1:
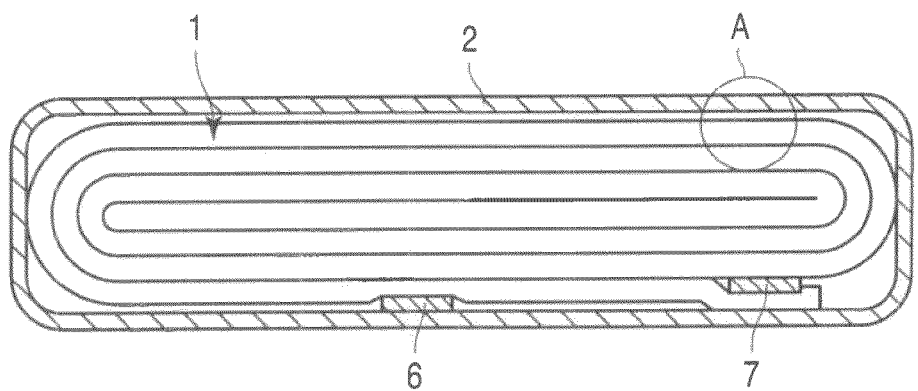
FIG. 1 is a cross-sectional view showing a flat type non-aqueous electrolyte battery according to an embodiment.
Figure 2:
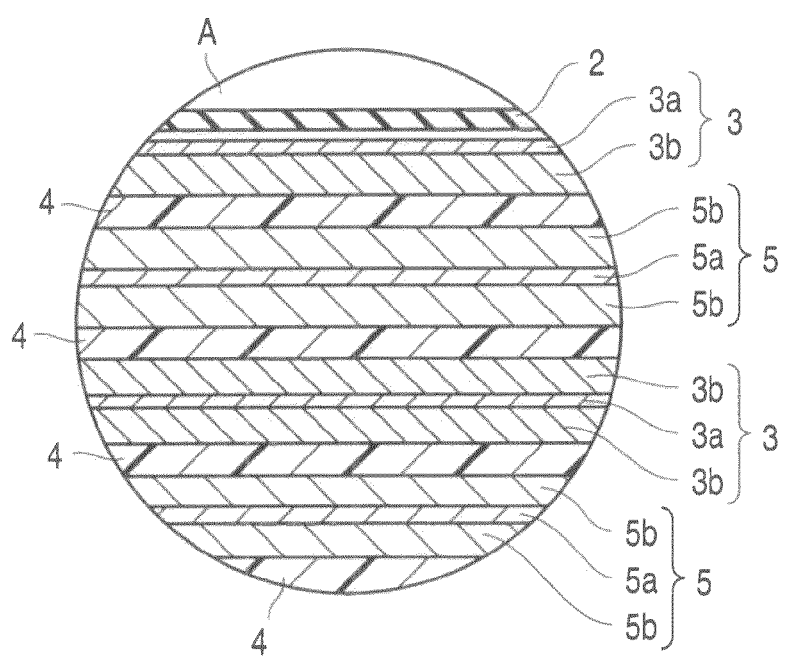
FIG. 2 is an enlarged cross-sectional view of the part A of FIG. 1.

Next, the non-aqueous electrolyte battery (for example, a flat type non-aqueous electrolyte battery comprising an outer container composed of a laminate film) according to the embodiment is explained more specifically with referring to FIGS. 1 and 2. FIG. 1 is a cross-sectional view of a thin-type non-aqueous electrolyte battery, and FIG. 2 is an enlarged cross-sectional view of the part A in FIG. 1. The respective drawings are schematic drawings for explaining on and promoting understanding toward the embodiment, and although some of the shape, size, ratio and the like thereof are different from those of an actual apparatus, these can be suitably modified in design with referring to the following explanations and known techniques.

A flattened wound electrode group 1 is housed in a bag-like outer container 2 which is formed from a laminate film comprising a couple of resin films with a metal layer interposed between them. The flattened wound electrode group 1 is constructed by spirally wounding and press-molding a laminate comprising mentioning from outside, a negative electrode 3, a separator 4, a positive electrode 5 and a separator 4.

As shown in FIG. 2, the negative electrode 3 on the outermost shell has a constitution in which a negative electrode layer 3b comprising a particulate active material is formed on one surface on the inner surface side of a negative electrode current collector 3a. The particulate active material comprises particles comprising a substance having a lithium absorption and desorption potential of from 1 V vs. Li/Li⁺ to 3 V vs. Li/Li⁺, and a coating layer of a spinel-type lithium-titanium composite oxide formed on the surface of each particle. Other negative electrode 3 is constituted by forming negative electrode layers 3b comprising the above-mentioned active material on the both surfaces of the negative electrode current collector 3a. The positive electrode 5 is constituted by forming the positive electrode layers 3b on the both surfaces of the positive electrode current collector 5a.

In the vicinity of the circumferential end of the flattened wound electrode group 1, a negative electrode terminal 6 is connected to the negative electrode current collector 3a of the negative electrode 3 of the outermost shell, and a positive electrode terminal 7 is connected to a positive electrode current collector 5a of the positive electrode 5 on the inner side. These negative electrode terminal 6 and positive electrode terminal 7 are extended outward from the opening of the bag-like outer container 2. For example, a liquid non-aqueous electrolyte is injected from the opening of the bag-like outer container 2. By interposing the negative electrode terminal 6 and positive electrode terminal 7 in the opening of the bag-like outer container 2 and heat-sealing, the flattened wound electrode group 1 and liquid non-aqueous electrolyte are sealed off completely.

For the negative electrode terminal, for example, a material having electric stability and conductivity at a potential against a lithium ion metal in the range of from 1 V to 3.0 V can be used. Specific examples may include aluminum, or aluminum alloys comprising elements such as Mg, Ti, Zn, Mn, Fe, Cu and Si. The negative electrode terminal is preferably composed of the same material as that of the negative electrode current collector so as to decrease contact resistance against the negative electrode current collector.

For the positive electrode terminal, a material having electric stability and conductivity of a potential against a lithium ion metal in the range of from 3.0 V to 4.25 V can be used. Specific examples may include aluminum, or aluminum alloys comprising elements such as Mg, Ti, Zn, Mn, Fe, Cu and Si. The positive electrode terminal is preferably composed of the same material as that of the positive electrode current collector so as to decrease a contact resistance against the positive electrode current collector.

According to such non-aqueous electrolyte battery of the embodiment, since the battery comprises a negative electrode comprising a particulate negative electrode active material, and the above-mentioned particulate negative electrode active material comprises particle containing a substance having a specific lithium absorption and desorption potential and a coating layer made of a spinel-type lithium-titanium composite oxide formed on the surface of the particle, safety during internal short circuiting can be improved without decrease in high current performance by the action of the above-mentioned active material.

Next, the battery pack of the embodiment is explained in detail.

In general, according one embodiment, a battery pack comprises a plurality of the above-mentioned non-aqueous electrolyte batteries (unit cells), each of the unit cells being electrically connected with each other in series, in parallel, or in series and parallel.

The non-aqueous electrolyte battery of the embodiment can maintain high safety even a plurality of the batteries as unit cells are used as a battery module.

Figure 3:
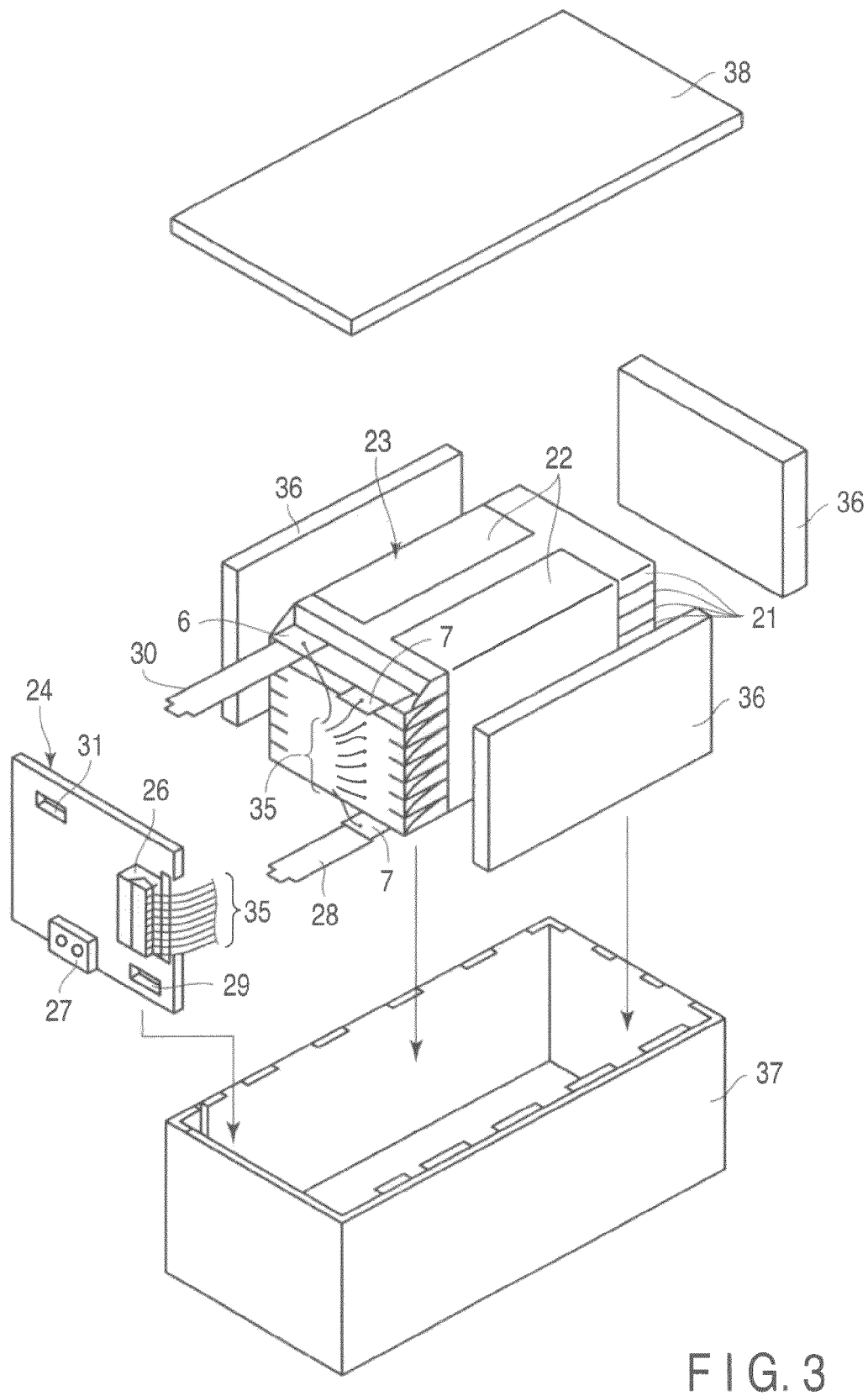
FIG. 3 is an exploded perspective view showing a battery pack according to the embodiment.
Figure 4:
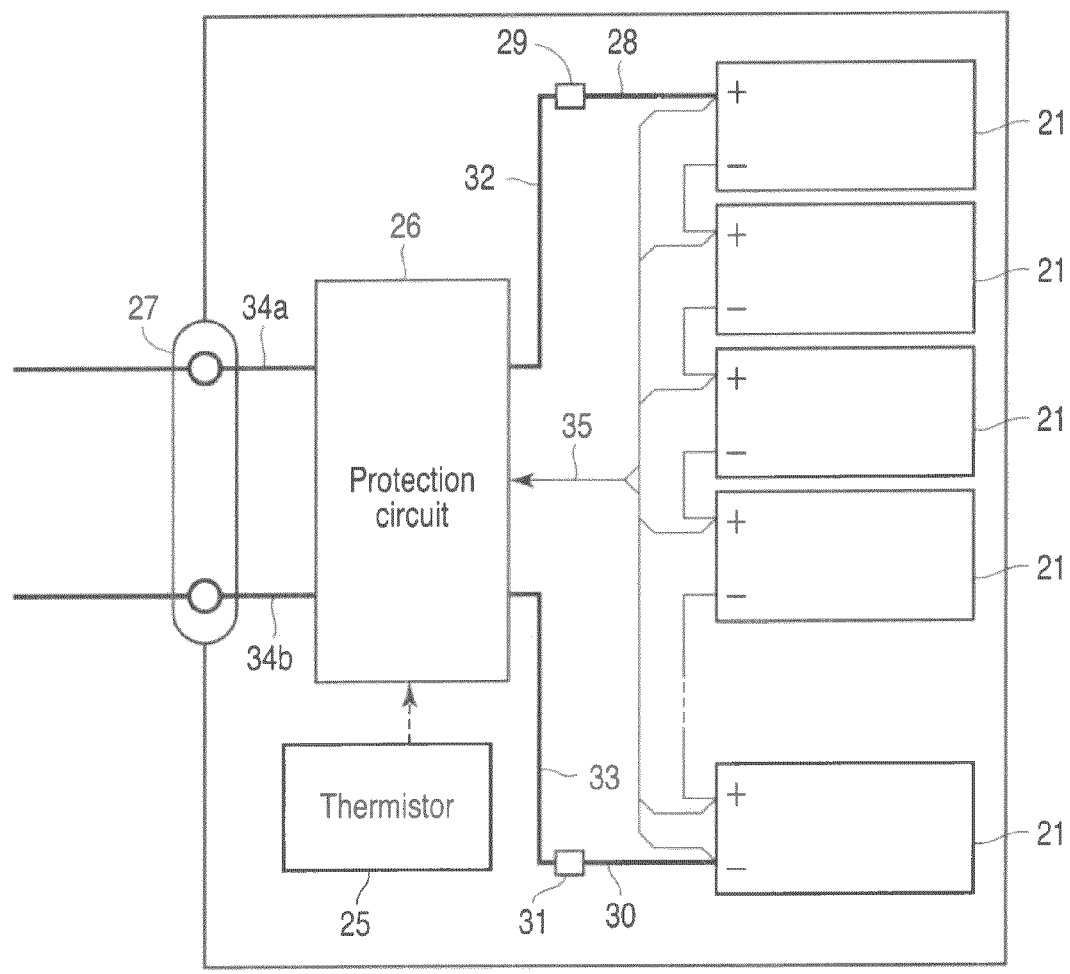
FIG. 4 is a block drawing of the battery pack of FIG. 3.

Such battery pack is explained in detail with referring to FIG. 3 and FIG. 4. For the unit cell, the flat type battery shown in FIG. 1 can be used.

A plurality of unit cells 21 that are constituted by the flat type non-aqueous electrolyte battery shown in the above-mentioned FIG. 1 are stacked so that the negative electrode terminal 6 and positive electrode terminal 7 that are extended to outside are aligned in the same direction, and are bound by an adhesive tape 22 to constitute a battery module 23. As shown in FIG. 4, the unit cells 21 are connected electrically in series with each other.

A printed wiring board 24 is disposed opposing to the side surface of the unit cells 21 from which the negative electrode terminal 6 and positive electrode terminal 7 are extended. As shown in FIG. 4, a thermistor 25, a protection circuit 26, and a terminal 27 for carrying a current to an external device are mounted on the printed wiring board 24. In addition, an insulating board (not shown) is attached to the surface opposing to the battery module 23 of the protection circuit substrate 24 so as to avoid unnecessary connection with the wiring of the battery module 23.

A positive electrode-side lead 28 is connected to the positive electrode terminal 7 that is positioned at the lowermost layer of the battery module 23, and the tip thereof is inserted to and electrically connected to a positive electrode-side connector 29 of the printed wiring board 24. A negative electrode-side lead 30 is connected to the negative electrode terminal 6 that is positioned at the uppermost layer of the battery module 23, and the tip thereof is inserted to and electrically connected to a negative electrode-side connector 31 of the printed wiring board 24. These connectors 29 and 31 are connected to a protection circuit 26 through wirings 32 and 33 that are formed on the printed wiring board 24.

The thermistor 25 detects the temperature of the unit cells 21, and the detection signal thereof is sent to the protection circuit 26. The protection circuit 26 can break a plus-side wiring 34a and a minus-side wiring 34b between the protection circuit 26 and the terminal 27 for carrying a current to an external device, under a predetermined condition. The predetermined condition refers to, for example, the time at which the detection temperature of the thermistor 25 reaches a predetermined temperature or more. Furthermore, the predetermined condition refers to the time at which the overcharge, over-discharge, over-current or the like of the unit cells 21 is detected. The detection of overcharge or the like is performed on each unit cell 21 or the entirety of the unit cells 21. When detection is performed on each unit cell 21, a battery voltage may be detected, or a positive electrode potential or negative electrode potential may be detected. In the latter case, a lithium electrode that is used as a reference electrode is inserted into each unit cell 21. In the case of FIG. 3 and FIG. 4, wirings 35 for detection of a voltage are connected to the respective unit cells 21, and detection signals are sent to the protection circuit 26 through these wirings 35.

Protective sheets 36 made of a rubber or resin are disposed respectively on the three side surfaces of the battery module 23 except for the side surface from which the positive electrode terminal 7 and negative electrode terminal 6 protrude.

The battery module 23 is housed in a housing container 37 together with the respective protective sheets 36 and the printed wiring board 24. Namely, the protective sheets 36 are disposed respectively on the both inner surfaces in the longitudinal side direction and the inner surface in the short side direction of the housing container 37, and the printed wiring board 24 is disposed on the inner surface on the opposite side in the short side direction. The battery module 23 is positioned in a space surrounded by the protective sheets 36 and the printed wiring board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Although an embodiment in which the unit cells 21 are connected in series is shown in FIG. 3 and FIG. 4, the unit cells may be connected in parallel, or series connection and parallel connection may be combined so as to increase a battery capacity. Assembled battery packs may further be connected in series or parallel.

Furthermore, the embodiment of the battery pack is suitably changed according to use. Preferable use of the battery pack is one for which cycle performance under high current property is desired. Specific examples may include uses in power sources for digital cameras, and in-car uses in two to four-wheeled hybrid battery automobiles, two to four-wheeled battery automobiles, motor assisted bicycles and the like. Specifically, in-car uses are preferable.

As mentioned above, a non-aqueous electrolyte battery having excellent high temperature property can be obtained by using a mixing solvent obtained by mixing at least two or more selected from the group consisting of propylene carbonate (PC), ethylene carbonate (EC) and γ-butyrolactone (GBL), or a non-aqueous electrolyte comprising γ-butyrolactone (GBL). A battery pack comprising a battery module comprising a plurality of such non-aqueous electrolyte batteries is specifically preferable for in-car uses.

Hereinafter the examples of the present invention are explained. Unless going beyond the gist of the present invention, the present invention is not limited by the following examples.

EXAMPLE 1

<Preparation of Positive Electrode>

First, 90% by weight of a spinel-type lithium manganese oxide ($LiMn_{1.9}Al_{0.1}O_4$) particles as a positive electrode active material, 5% by weight of acetylene black as a conductive agent and 5% by weight of polyvinylidene fluoride (PVdF) were added to N-methylpyrrolidone (NMP) and mixed to prepare a slurry. The slurry was applied to the both surfaces of a current collector composed of an aluminum foil having a thickness of 15 μm, dried and pressed to prepare a positive electrode having an electrode density of 2.9 $g/cm^3$.

<Preparation of Negative Electrode Active Material>

First, $Li_2CO_3$ and anatase-type $TiO_2$ were mixed so that the molar ratio of Li:Ti became 2:3, and the mixture was calcined at 1,000° C. for 12 hours in the air and pulverized to give a particulate ramsdellite-type lithium-titanium composite oxide ($Li_2Ti_3O_7$) [precursor particles] having an average particle size of 0.8 μm.

The average particle size was measured by using a laser diffraction-type distribution measuring apparatus (SALD-3000: manufactured by Shimadzu Corporation). Namely, the average particle size was obtained by a method comprising adding about 0.1 g of the precursor particles as a sample, a surfactant and 1 to 2 mL of distilled water to a beaker, sufficiently stirring and pouring the mixture into a stirring water bath, measuring a luminous intensity distribution at intervals of 2 seconds for 64 times by using the measuring apparatus, and analyzing the particle size distribution data.

Next, a mixed solution of 4 parts by weight of lithium acetate ($CH_3COOLi$), 5 parts by weight of titanium tetraisopropoxide ($[(CH_3)_2CHO]_4Ti$), 5 parts by weight of polyvinyl pyrrolidone (PVP), 60 parts by weight of acetic acid ($CH_3COOH$) and 100 parts by weight of isopropyl alcohol (i-$C_3H_7OH$) was prepared. The precursor particles that were synthesized in advance were coated with this solution by using a tumbling-fluidizing coating process. The thus-obtained precursor particles having a coating layer on the surface were subjected to a heat treatment at 600° C. for 10 minutes to prepare a negative electrode active material.

The cross-sectional surface tissue of the obtained negative electrode active material was observed by FIB-TEM. As a result, the thickness of the coating layer was 30 nm. Furthermore, an XRD analysis was performed on a substance that was obtained by calcining only the coating solution under the same condition, and it was found that the substance was a spinel-type lithium-titanium oxide ($Li_4Ti_5O_{12}$). It was confirmed from these facts that the obtained negative electrode active material comprised a particulate ramsdellite-type lithium-titanium composite oxide ($Li_2Ti_3O_7$) and a coating layer of a spinel type ($Li_4Ti_5O_{12}$) having a thickness of 30 nm formed on the surface thereof. Furthermore, the average particle size was 0.8 µm, which was the same as that before coating.

<Preparation of Negative Electrode>

90% by weight of the obtained negative electrode active material, 5% by weight of acetylene black as a conductive agent and 5% by weight of polyvinylidene fluoride (PVdF) were added to N-methylpyrrolidone (NMP) and mixed to prepare a slurry. This slurry was applied on the both surfaces of a current collector composed of an aluminum foil having a thickness of 15 µm, dried and pressed to prepare a negative electrode having an electrode density of 2.3 g/cm$^3$.

<Preparation of Electrode Group>

The positive electrode, a separator composed of a porous film made of polyethylene having a thickness of 25 µm, the negative electrode and a separator were sequentially laminated in this order to prepare a planar electrode group. The obtained electrode group was housed in a pack composed of an aluminum laminate film, and subjected to vacuum drying at 80° C. for 24 hours.

<Preparation of Liquid Non-Aqueous Electrolyte>

1.5 mol/L of $LiBF_4$ as an electrolyte was dissolved in a mixed solvent obtained by mixing ethylene carbonate (EC) and γ-butyrolactone (GBL) at a volume ratio of 1:2 to prepare a liquid non-aqueous electrolyte.

The liquid non-aqueous electrolyte was injected into the laminate film pack housing the electrode group, and the pack was completely sealed off by heat sealing to manufacture a non-aqueous electrolyte secondary battery having the structure as shown in FIG. 1 and having a width of 70 mm, a thickness of 6.5 mm, a height of 120 mm and a capacity of 3 Ah.

COMPARATIVE EXAMPLE 1

A non-aqueous electrolyte secondary battery was manufactured by a similar method to that of Example 1, except that only the particulate ramsdellite-type lithium-titanium composite oxide ($Li_2Ti_3O_7$), which was the precursor particles synthesized in Example 1, was used as a negative electrode active material.

COMPARATIVE EXAMPLE 2

A non-aqueous electrolyte secondary battery was manufactured by a similar method to that of Example 1, except that a negative electrode active material that was obtained by simply mixing the particulate ramsdellite-type lithium-titanium composite oxide ($Li_2Ti_3O_7$), which was the precursor particles synthesized in Example 1, and a $Li_4Ti_5O_{12}$ particles having an average particle size of 0.8 µm by a weight ratio of 9:1 was used.

The loading properties at 1 C and 30 C were evaluated for the obtained batteries of Example 1 and Comparative Examples 1 and 2. Thereafter each battery was charged up to 3.0 V, and an internal short circuit was forcibly caused by pressing a semi-columnar metal body made of stainless steel for short circuiting having a diameter of 1 cm against the flat surface of the battery, and the surface temperature of the battery was measured. The results are shown in Table 1.

TABLE 1

| | Maximum temperature of battery (first time) | Maximum temperature of battery (second time) |
| --- | --- | --- |
| Example 1 | 98° C. | 102° C. |
| Comparative Example 1 | 152° C. | 153° C. |
| Comparative Example 2 | 150° C. | 155° C. |

As is apparent from the above-mentioned Table 1, it was confirmed that the maximum temperature at the center portion of the battery of Example 1 was lower than those of the batteries of Comparative Examples 1 and 2 at both the first and second times, i.e., the heat generation of the battery was small and the battery had high safety. The temperature of the battery of Comparative Example 2 for which the negative electrode active material obtained by simply mixed the respective particles of $Li_2Ti_3O_7$ and $Li_4Ti_5O_{12}$ was used had a similar temperature to that of the battery of Comparative Example 1 in which negative electrode active material comprising only $Li_2Ti_3O_7$ was used, and thus an effect of suppressing heat generation was not exhibited.

EXAMPLE 11

A positive electrode and a negative electrode that were similar to those of Example 1 (except that they had a positive electrode layer and a negative electrode layer on only one surface) were prepared. The positive electrode and negative electrode were disposed so that the positive electrode layer and negative electrode layer were opposed to each other, and a separator having a short circuit area of 18 mm square was disposed therebetween to assemble a single-layer battery. The separator was impregnated with a liquid non-aqueous electrolyte having a similar composition to that of Example 1.

COMPARATIVE EXAMPLE 11

A positive electrode and a negative electrode that were similar to those of Comparative Example 1 (except that they had a positive electrode layer and a negative electrode layer on only one surface) were prepared. The positive electrode and negative electrode were disposed so that the positive electrode layer and negative electrode layer were opposed to each other, and a separator having a short circuit area of 18 mm square was disposed therebetween to assemble a single-layer battery. The separator was impregnated with a liquid non-aqueous electrolyte having a similar composition to that of Example 1.

EXAMPLES 12 and 13

Two kinds of negative electrodes that were similar to those of Example 1 (the negative electrode layer was formed on only one surface) were prepared by using negative electrode active materials obtained by forming a coating layer of a spinel-type lithium-titanium oxide ($Li_4Ti_5O_{12}$) on the surface of a particulate ramsdellite-type lithium-titanium composite oxide ($Li_2Ti_3O_7$) [precursor particles]. The coating layers had thicknesses of 5 nm and 50 nm, respectively. Using the obtained respective negative electrodes, single-layer batteries that were similar to that of Example 11 were assembled respectively.

COMPARATIVE EXAMPLE 12 AND EXAMPLE 14

Two kinds of negative electrodes that were similar to those of Example 1 (the negative electrode layer was formed on only one surface) were prepared by using a negative electrode active material composed of only a particulate bronze-type titanium oxide [precursor particles] having an average particle size of 0.6 μm, and a negative electrode active material obtained by forming a coating layer of a spinel-type lithium-titanium oxide ($Li_4Ti_5O_{12}$) on the surface of the above-mentioned particulate bronze-type titanium oxide. The coating layer had a thickness of 10 nm. Using these negative electrodes, single-layer batteries that were similar to that of Example 11 were assembled respectively.

COMPARATIVE EXAMPLE 13 AND EXAMPLE 15

Two kinds of negative electrodes that were similar to those of Example 1 (the negative electrode layer was formed on only one surface) were prepared by using a negative electrode active material composed of only a particulate lithium-molybdenum oxide [precursor particles] having an average particle size of 3 μm, and a negative electrode active material obtained by forming a coating layer of a spinel-type lithium-titanium oxide ($Li_4Ti_5O_{12}$) on the surface of the above-mentioned particulate lithium-molybdenum oxide. The coating layer had a thickness of 10 nm. Using these negative electrodes, single-layer batteries that were similar to that of Example 11 were assembled respectively.

COMPARATIVE EXAMPLE 14 AND EXAMPLE 16

Two kinds of negative electrodes similar to that of Example 1 (the negative electrode layer was formed on only one surface) were prepared by using a negative electrode active material composed of only a particulate lithium-niobium oxide [precursor particles] having an average particle size of 3 μm, and a negative electrode active material obtained by forming a coating layer of a spinel-type lithium-titanium oxide ($Li_4Ti_5O_{12}$) on the surface of the above-mentioned particulate lithium-niobium oxide. The coating layer had a thickness of 10 nm. Using these negative electrodes, single-layer batteries that were similar to that of Example 11 were assembled respectively.

The short circuit area of the single-layer battery obtained in each of Examples 11 to 16 and Comparative Examples 11 to 14 was pressed by a pressure of about 7 N/cm$^2$, and change in the voltage was monitored. The times for the battery voltage to become 1 V for the respective batteries are shown in the following Table 2. The specific surface areas of the respective negative electrode active materials are also described in the following Table 2.

TABLE 2

| | Negative electrode active material | | | | |
|---|---|---|---|---|---|
| | Precursor particles (primary active material) | Particle size (μm) | Thickness of coating layer (nm) | Specific surface area (m$^2$/g) | Arrival time (min) |
| Example 11 | $Li_2Ti_3O_7$ | 0.8 | 30 | 10 | >30 |
| Comparative Example 11 | $Li_2Ti_3O_7$ | 0.8 | 0 (none) | 10 | <3 |
| Example 12 | $Li_2Ti_3O_7$ | 0.8 | 5 | 10 | >30 |
| Example 13 | $Li_2Ti_3O_7$ | 0.8 | 50 | 10 | >30 |
| Comparative Example 12 | $TiO_2$ (bronze type) | 0.6 | 0 (none) | 20 | <3 |
| Example 14 | $TiO_2$ (bronze type) | 0.6 | 10 | 20 | >30 |
| Comparative Example 13 | $Li_xMoO_2$ | 3 | 0 (none) | 5 | <3 |
| Example 15 | $Li_xMoO_2$ | 3 | 10 | 5 | >30 |
| Comparative Example 14 | $Li_xNb_2O_5$ | 3 | 0 (none) | 5 | <3 |
| Example 16 | $Li_xNb_2O_5$ | 3 | 10 | 5 | >30 |

As is apparent from the above-mentioned Table 2, decrease in the voltage during short circuit of the single-layer batteries of Examples 11 to 16 each having a negative electrode comprising a negative electrode active material having a coating layer of a spinel-type lithium-titanium oxide ($Li_4Ti_5O_{12}$) formed on the surface thereof was slower than that in the batteries of Comparative Examples 11 to 14 each having a negative electrode comprising a negative electrode active material having no coating layer of the spinel-type lithium-titanium oxide on the surface thereof. This is because the spinel-type lithium-titanium oxide that is the coating layer of the negative electrode active material suppresses the reaction during short circuit. It was confirmed from such results that the batteries of Examples 11 to 16 generated small heat during internal short circuiting and had high safety.

COMPARATIVE EXAMPLE 15

A negative electrode similar to that of Example 1 (the negative electrode layer was formed on only one surface) was prepared by using a negative electrode active material obtained by forming a coating layer of alumina having a thickness of 50 nm on the surface of a particulate ramsdellite-type lithium-titanium composite oxide ($Li_2Ti_3O_7$) having an average particle size of 0.8 μm. Using the obtained negative electrode, a single-layer battery similar to that of Example 11 was assembled.

COMPARATIVE EXAMPLE 16

A negative electrode similar to that of Example 1 (the negative electrode layer was formed on only one surface) was prepared by using a negative electrode active material composed of only spherical artificial graphite having an average particle size of 20 μm. Using the obtained negative electrode, a single-layer battery similar to that of Example 11 was assembled.

COMPARATIVE EXAMPLE 17

A negative electrode similar to that of Example 1 (the negative electrode layer was formed on only one surface) was prepared by using a negative electrode active material obtained by forming a coating layer of a spinel-type lithium-titanium oxide ($Li_4Ti_5O_{12}$) having a thickness of 50 nm on the surface of a spherical artificial graphite having an average particle size of 20 μm. Using the obtained negative electrode, a single-layer battery similar to that of Example 11 was assembled.

COMPARATIVE EXAMPLE 18

A negative electrode similar to that of Example 1 (the negative electrode layer was formed on only one surface) was prepared by using a negative electrode active material obtained by forming a coating layer of alumina having a thickness of 50 nm on the surface of a spherical artificial graphite having an average particle size of 20 μm. Using the obtained negative electrode, a single-layer battery similar to that of Example 11 was assembled.

The high current performances of the above-mentioned single-layer batteries of Example 13 and Comparative Example 11 and of the obtained single-layer batteries of Comparative Examples 15 to 18 were measured. As an index of high current performance, a ratio of a 10 C capacity to a 1 C capacity was adopted. The results are shown in the following Table 3.

The following Table 3 also describes the specific surface areas of the respective negative electrode active materials.

used as the coating layer on the surface of the spherical artificial graphite. This was inferred that the spherical artificial graphite reacted with the coating layer, the lithium-titanium oxide, during formation of the coating layer on the surface thereof, whereby a gap (a high resistant layer) was formed on the boundary between the spherical artificial graphite and the coating layer.

EXAMPLE 21

A coating layer of a spinel-type lithium-titanium oxide ($Li_4Ti_5O_{12}$) having a thickness of about 50 nm was formed on the surface of particulate $MoO_2$ having an average particle size of 250 nm to prepare a negative electrode active material. At that time, the negative electrode capacity of particulate $MoO_2$ only was about 300 mAh/g. Using this negative electrode active material, a slurry (negative electrode slurry A) was prepared according to a similar method to that of Example 1.

A slurry (negative electrode slurry B) was prepared according to a similar method to that of Example 1 by using only $MoO_2$ having no coating layer as a negative electrode active material.

TABLE 3

| | Negative electrode active material | | | | | |
|---|---|---|---|---|---|---|
| | Precursor particles (primary active material) | Particle size (μm) | Coating layer | | Specific surface area (m²/g) | 10 C capacity/ 1 C capacity (%) |
| | | | Material | Thickness | | |
| Comparative Example 11 | $Li_2Ti_3O_7$ | 0.8 | — | 0 (none) | 10 | 95 |
| Example 13 | $Li_2Ti_3O_7$ | 0.8 | $Li_4Ti_5O_{12}$ | 50 | 10 | 95 |
| Comparative Example 15 | $Li_2Ti_3O_7$ | 0.8 | $Al_2O_3$ | 50 | 10 | 84 |
| Comparative Example 16 | Spherical artificial graphite | 20 | — | 0 none | 2.3 | 78 |
| Comparative Example 17 | Spherical artificial graphite | 20 | $Li_4Ti_5O_{12}$ | 50 | 2.3 | 45 |
| Comparative Example 18 | Spherical artificial graphite | 20 | $Al_2O_3$ | 50 | 2.3 | 40 |

As is apparent from the above-mentioned Table 3, the battery of Example 13 that used the negative electrode active material comprising a particulate ramsdellite-type lithium-titanium composite oxide ($Li_2Ti_3O_7$) [precursor particles] and a coating layer of a spinel-type lithium-titanium oxide ($Li_4Ti_5O_{12}$) formed on the surface thereof showed similar high current performance to that of the battery of Comparative Example 11 that used only the particulate ramsdellite-type lithium-titanium composite oxide as the negative electrode active material, and thus it is understood that the coating layer does not block high current performance.

On the other hand, it is understood that high current performance is decreased in the batteries of Comparative Examples 15 and 18 that used a negative electrode active material having a coating layer of $Al_2O_3$ on the surface. The spinel-type lithium-titanium oxide that is the coating layer of Example 13 is changed from an insulator to a good conductor by absorbing lithium. On the other hand, alumina that is the coating layer of Comparative Example 15 does not absorb lithium, and remains an insulator. This difference in form appears as the difference in battery performance (high current performance).

Furthermore, it is understood that high current performance is also decreased in the battery of Comparative Example 17 when a spinel-type lithium-titanium oxide is Then, the above-mentioned negative electrode slurry B was applied to one surface of a current collector made of an aluminum foil and dried to form a primary negative electrode layer having a thickness of 45 μm. The above-mentioned negative electrode slurry A was then applied to the surface of the primary negative electrode layer and dried to form a surface layer having a thickness of 5 μm. Pressing was then performed to prepare a negative electrode comprising a negative electrode layer having a density of 1.7 g/cm³.

Using the obtained negative electrode, a single-layer battery similar to that of Example 11 was assembled.

EXAMPLE 22

A single-layer battery similar to that of Example 21 was assembled except that the primary negative electrode layer had a thickness of 25 μm and the surface layer had a thickness of 25 μm.

EXAMPLE 23

The negative electrode slurry A that was similar to that of Example 21 was applied to one surface of a current collector made of an aluminum foil, dried and further pressed to prepare a negative electrode comprising a negative electrode layer having a thickness of 50 μm and a density of 1.7 g/cm³. Using the obtained negative electrode, a single-layer battery similar to that of Example 11 was assembled.

COMPARATIVE EXAMPLE 21

A negative electrode slurry B that was similar to that of Example 21 was applied to one surface of a current collector made of an aluminum foil, dried, and further pressed to prepare a negative electrode comprising a negative electrode layer having a thickness of 50 μm and a density of 1.7 g/cm³. Using the obtained negative electrode, a single-layer battery similar to that of Example 11 was assembled.

The short circuit area of each of the obtained single-layer batteries of Examples 21 to 23 and Comparative Example 21 was pressed by a pressure of about 7 N/cm², and change in the voltage was monitored. The times for the battery voltage to become 1 V for the respective batteries are shown in the following Table 4. Furthermore, the energy densities of the respective batteries were obtained by a ratio based on the battery of Comparative Example 21. The results are shown in the following Table 4.

TABLE 4

| | Negative electrode layer | | | |
|---|---|---|---|---|
| | Active substance (upper column) and thickness (lower column) [μm] of primary negative electrode layer | Thickness [μm] of surface layer (active substance: $MoO_2/Li_4Ti_5O_{12}$) | Energy density | Arrival time (min) |
| Example 21 | $MoO_2$ 45 | 5 | 0.98 | >30 |
| Example 22 | $MoO_2$ 25 | 25 | 0.89 | >30 |
| Example 23 | $MoO_2/Li_4Ti_5O_{12}$ 50 | — | 0.80 | >30 |
| Comparative Example 21 | $MoO_2$ 50 | — | 1 | <3 |

As is apparent from the above-mentioned Table 4, it is understood that an internal short circuit reaction proceeds rapidly in the battery of Comparative Example 21 using the negative electrode comprising the single negative electrode layer containing the negative electrode active material composed of $MoO_2$.

In contrast to this, it is understood that an internal short circuit reaction can be reduced by either of the battery comprising a single negative electrode layer containing a negative electrode active material obtained by forming a coating layer of a spinel-type lithium-titanium oxide ($Li_4Ti_5O_{12}$) having a thickness of about 50 nm on the surface of particulate $MoO_2$ (Example 23) and the batteries using two negative electrode layers composed of a primary negative electrode layer and a surface layer (comprising the above-mentioned negative electrode active material) (Examples 21 and 22).

Furthermore, among the batteries of Examples 21 and 22 having two negative electrode layers composed of a surface layer comprising a negative electrode active material on which a coating layer is formed and a primary negative electrode layer comprising a negative electrode active material composed of particulate $MoO_2$, the energy density of the battery is the highest in the battery of the former Example 21 that has a smaller thickness ratio, and is the lowest in Example 23 that has a single negative electrode comprising a negative electrode active material on which a coating layer is formed. This is because the capacity of $MoO_2$ that is the active material for the primary negative electrode layer is higher than that of the spinel-type lithium-titanium oxide that is the coating layer. Namely, the effect of improving safety during internal short circuiting can be achieved as long as a negative electrode active material having a coating layer of a spinel-type lithium-titanium oxide is disposed on the outermost surface (positive electrode side) of the negative electrode layer. Furthermore, decrease in the energy density of a battery can also be alleviated by using a negative electrode layer having a multilayer structure composed of a primary negative electrode layer and a surface layer, and selecting a substance having a larger energy density (capacity) than that of a spinel-type lithium-titanium oxide that is the coating layer as an active material for the primary negative electrode layer.

While the embodiments of the present invention have been described, the invention is not limited by these embodiments and can be modified in various ways within the category of the gist of the invention described in the claims. Furthermore, the present invention can be modified in various ways in the scope that does not go beyond the gist of the invention in carrying out the invention. In addition, various inventions can be formed by suitably combining a plurality of the constitutional elements disclosed in the above-mentioned embodiments.

What is claimed is:

1. A particulate negative electrode active material for batteries, comprising:
a particle containing a metal oxide substance having a lithium absorption and desorption potential of from 1 V vs. Li/Li⁺ to 3 V vs. Li/Li⁺, wherein the metal oxide substance is at least one selected from lithium-titanium composite oxides, lithium-molybdenum composite oxides and lithium-niobium composite oxides each having a structure of any of a ramsdellite type, an anatase type, a rutile type, a brookite type and a bronze type; and
a continuous coating film formed on the surface of the particle and made of a spinel-type lithium-titanium composite oxide.

2. The active material of claim 1, wherein the spinel-type lithium-titanium Composite oxide is $Li_{4+x}Ti_5O_{12}(-1 \leq x \leq 3)$.

3. The active material of claim 1, wherein the coating film has a thickness of 5 nm or more.

4. A non-aqueous electrolyte battery, comprising:
a container;
a positive electrode housed in the outer container;
a negative electrode housed in the container, being located spatially apart from the positive electrode and containing a particulate active material; and
a non-aqueous electrolyte filled in the container,
wherein the particulate active material comprises a particle containing a metal oxide substance having a lithium absorption and desorption potential of from 1 V vs. Li/Li⁺ to 3 V vs. Li/Li⁺, wherein the metal oxide substance is at least one selected from lithium-titanium composite oxides, lithium-molybdenum composite oxides and lithium-niobium composite oxides each having a structure of any of a ramsdellite type, an anatase type, a rutile type, a brookite type and a bronze type, and a continuous coating film formed on the surface of the particle and made of a spinel-type lithium-titanium composite oxide.

5. The battery of claim 4, wherein the negative electrode comprises a current collector and at least two negative electrode layers formed on at least one surface of the current collector, wherein the at least two negative electrode layers comprises a primary negative electrode layer formed on the surface of the current collector and a surface layer formed on the surface of the primary negative electrode layer, the primary negative electrode layer containing an active material that is different from the particulate active material, and the surface layer containing the particulate active material.

6. The battery of claim 5, wherein the active material that is different from the particulate active material has a lithium absorption and desorption potential of from 1 V vs. Li/Li$^+$ to 3 V vs. Li/Li$^+$.

7. The battery of claim 5, wherein the active material that is different from the particulate active material is at least one selected from the group consisting of lithium-titanium composite oxides (except for a spinel-type structure), lithium-molybdenum composite oxides and lithium-niobium composite oxides.

8. A battery pack comprising a plurality of the non-aqueous electrolyte batteries according to claim 4, wherein the batteries are electrically connected in series, in parallel or in series and parallel.

9. The active material of claim 1, wherein the coating film is formed by a surface area of 30% or more with respect to the surface of the particle.

10. The active material of claim 1, wherein the coating film is formed by a surface area of 50% or more with respect to the surface of the particle.

11. The battery of claim 4, wherein the coating film in the particulate active material is formed by a surface area of 30% or more with respect to the surface of the particle in the particulate active material.

12. The battery of claim 4, wherein the coating film in the particulate active material is formed by a surface area of 50% or more with respect to the surface of the particle in the particulate active material.

* * * * *